United States Patent [19]

Wisman

[11] 4,042,965
[45] Aug. 16, 1977

[54] POWER INTERRUPTION SAFEGUARD APPARATUS

[75] Inventor: Franklin O. Wisman, Chambersburg, Pa.

[73] Assignee: T. B. Wood's Sons Company, Chambersburg, Pa.

[21] Appl. No.: 683,758

[22] Filed: May 6, 1976

[51] Int. Cl.² .............................................. H02H 7/08
[52] U.S. Cl. ................................... 361/29; 361/100; 361/114
[58] Field of Search .................... 361/23, 28, 29, 33, 361/92, 100, 114; 318/446

[56] References Cited

U.S. PATENT DOCUMENTS

| | | | |
|---|---|---|---|
| 3,555,386 | 1/1971 | Wisman | 318/356 X |
| 3,903,456 | 9/1975 | Schaefer | 361/114 X |
| 3,958,164 | 5/1976 | Hess | 361/33 X |

*Primary Examiner*—Harry E. Moose, Jr.
*Attorney, Agent, or Firm*—B. P. Fishburne, Jr.

[57] ABSTRACT

Apparatus for the prevention of undesirable and possibly hazardous automatic application of power to a load in the event of an outage from a power source and a subsequent re-application of power therefrom. Described is a thyristor type of circuit interrupter coupled into a control circuit which is operative to control the operation of phase-controlled SCR circuit which is cyclically operative to couple power from an AC power source to a load device such as a DC motor. In the preferred embodiment, an SCR circuit interrupter is coupled into the DC supply circuit of a control circuit comprising, inter alia, a pulse generator which provides trigger pulses which are applied to a pair of silicon controlled rectifiers in the phase-controlled SCR circuit.

A two-pole, two-position switch is adapted in one (STOP) position to couple the AC power source to the SCR circuit interrupter which includes means for being latched, i.e., rendered conductive and remaining conductive for a short time interval following the removal of the AC therefrom. The switch is then thrown to the other (RUN) position, whereupon the AC source is disconnected from the SCR circuit interrupter and applied to a semiconductor rectifier bridge circuit and phase-controlled SCR circuit. The rectifier bridge circuit immediately supplies DC power to the pulse generator through the now conductive SCR circuit interrupter. In the event of an outage from the AC source, however, the SCR circuit interrupter will become non-conductive rendering the pulse generator inoperative which will remain non-conductive until the switch is moved to the STOP position.

26 Claims, 5 Drawing Figures

POWER INTERRUPTION SAFEGUARD APPARATUS

CROSS-REFERENCE TO RELATED APPLICATION

The present invention is related to the subject inventor's copending application U.S. Ser. No. 605,621 now U.S. Pat. No. 4,010,411, "Motor Control System," filed on Aug. 13, 1975, which application is also assigned to the same assignee.

BACKGROUND OF THE INVENTION

This invention relates generally to electrical control circuitry for the prevention of undesired reapplication of power to a load device in event of a power outage and more particularly to apparatus for controlling the application of power to a load device such as a shunt field DC motor which has rectified AC power supplied thereto from a phase-controlled circuit including controlled semiconductor switch means such as silicon control rectifiers.

Solid state electronic controls for motor speed control of a direct current shunt field motor are well known to those skilled in the art. Such a teaching is contained in U.S. Pat. No. 3,555,386, "Control Apparatus for Motors and the Like," F. O. Wisman and the above referenced related application, U.S. Ser. No. 605,621, now U.S. Pat. No. 4,010,411. Such systems utilize AC to DC conversion apparatus which is adapted to provide a controlled application of rectified AC power to the motor's armature circuit by means of the synchronous cyclic conduction of silicon controlled rectifiers (SCR). The SCR's are driven into conduction by means of trigger pulses applied from a pulse generator which receives its DC power supply potential from a bridge circuit also coupled to the AC power.

In some usages of such a circuit arrangement, it may be undesirable or hazardous if power is restored automatically to the motor in the event of an AC power outage which is then subsequently restored. It has long been known to preclude such unpredictable starting of motors and other types of machinery by incorporating circuit interrupters in the high power (AC) side of the line, for example magnetic contactors initially energized by momentary manual push buttons and held closed by one of their own contacts or by the use of a latching relay. However, the contactor approach is undesirable, particularly in lower power applications, for reasons of reliability, bulk, weight, cost and vulnerability to hostile environmental influences such as vibration and dust.

SUMMARY

It is a particular object of this invention, therefore, to achieve safety upon the occurrence of a power outage more economically and more reliably than heretofore.

It is another object of the subject invention to prevent unpredictable restarting of machinery in the event of power outage and the subsequent reapplication thereof without first taking positive action to restart such machinery.

Accordingly, the present invention is directed to improvement in electrical apparatus wherein power is supplied from a power source to a load such as a DC motor through cyclically conductive power conversion means having its operation controlled in accordance with control signals applied thereto from control circuit means, having a power supply potential generated from said power source coupled thereto for being rendered operative to produce said control signals and further comprising electrically controlled circuit interrupter means including thyristor type semiconductor switch means, having a conductive state and a non-conductive state, intercoupled between said supply potential and said control circuit means thereby rendering said control circuit means operative when in said conductive state, and circuit means coupled to said controlled switch means including a switch operable to temporarily couple said power source to said controlled switch means for causing said control switch means to initially assume said conductive state, said switch means thereafter being operable to couple said power source to said power conversion means, said control switch means becoming non-conductive in the event of a power outage to render said control circuit means inoperative until said switch temporarily reapplies said power source thereto.

Accordingly, in an illustrative embodiment the present invention effects circuit interruption in the relatively low power (DC) control circuit portion of a DC motor speed controller by means of a silicon controlled rectifier (SCR) which is adapted to be rendered conductive and thus complete a power supply circuit to the control circuit by initially being coupled to the AC power source which is then disconnected therefrom and applied to the remaining circuitry with the silicon controlled rectifier still being conductive to permit continued operation. In the event that an outage of the AC power source occurs, however, the SCR becomes automatically non-conductive requiring that the AC power source be subsequently reapplied by the manual closure of a switch before the AC power can be reapplied to the speed controller circuitry. Simple restoration of the AC power of itself will not spontaneously restart the DC motor.

DESCRIPTION OF THE PREFERRED EMBODIMENTS

Figure 1:
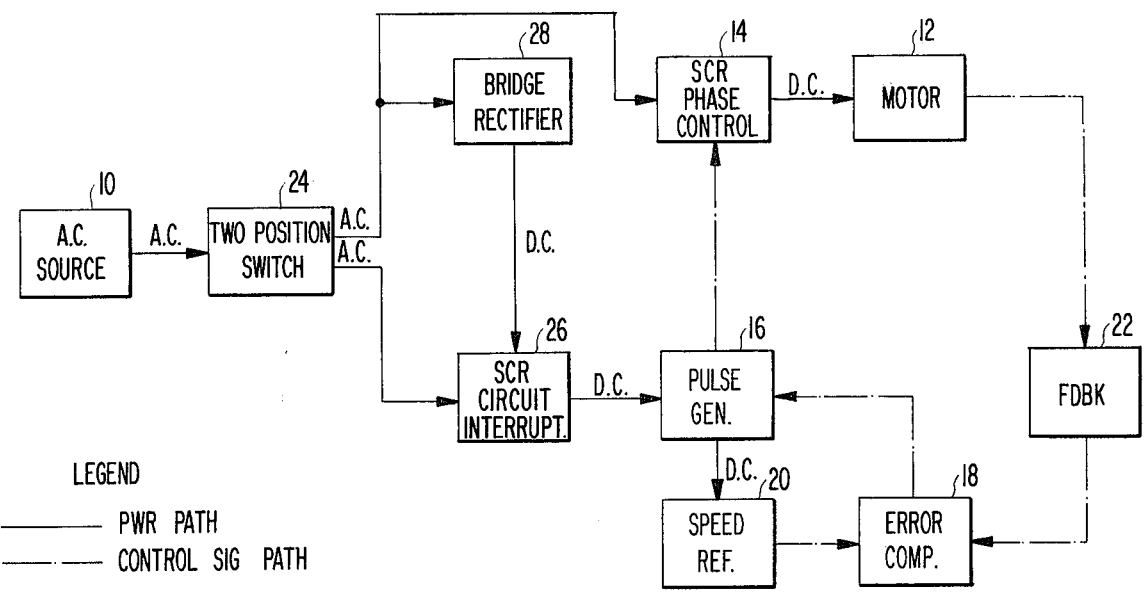
FIG. 1 is a block diagram illustrative of the preferred embodiment of the subject invention when used in connection with a DC motor speed control circuit.

Referring now to the drawings in detail, wherein like numerals designate like elements, the block diagram of FIG. 1 is intended to show, inter alia, the supply of electrical power from an AC power source 10 to a load such as a DC motor 12 by means of AC to DC power conversion apparatus such as a phase controlled SCR circuit 14. More particularly, the phase controlled SCR circuit 14 is adapted to control the power applied to the armature of the DC motor 12 for controlling its speed. The phase controlled SCR circuit is cyclically rendered conductive by the timing of trigger pulses applied from a pulse generator 16, whose operation is controlled in accordance with an error signal provided by an error comparator circuit 18, which receives a respective input from a speed reference circuit 20 and a feedback circuit 22.

The input from the speed reference circuit 20 is a signal corresponding to the desired speed whereas the signal from the feedback circuit 22 corresponds to the actual motor speed. Thus the motor speed is controlled by a simple feedback loop well known to those skilled in the art. Such apparatus, moreover, is shown in the inventor's copending application U.S. Ser. No. 605,621, referenced above and from which present FIG. 2 is taken in part and which is intended to be incorporated by reference herewith.

What is intended to be depicted in the block diagram of FIG. 1 is that the AC power is fed to the phase-controlled SCR circuitry through a two position switch 24 which may be manually operated, for example, one position of which is adapted to couple the AC source 10 to an SCR circuit interrupter 26. The latter circuit is adapted to provide a closed DC power path from a bridge rectifier 28 coupled to the switch 24 when in its other position for applying DC power supply potential to the pulse generator 16 as well as the speed reference circuit 20 and thus render them operative so that suitable control signals can be applied to the phase-controlled SCR circuit 14. The two position switch 24 thus is used to momentarily apply AC power to the SCR circuit interrupter 26 in order to render it operative but then removing the AC power supply therefrom and applying it to the bridge rectifier 28 and the SCR phase-control circuitry 14 in a manner which will be best understood with reference to FIG. 2.

Figure 2:
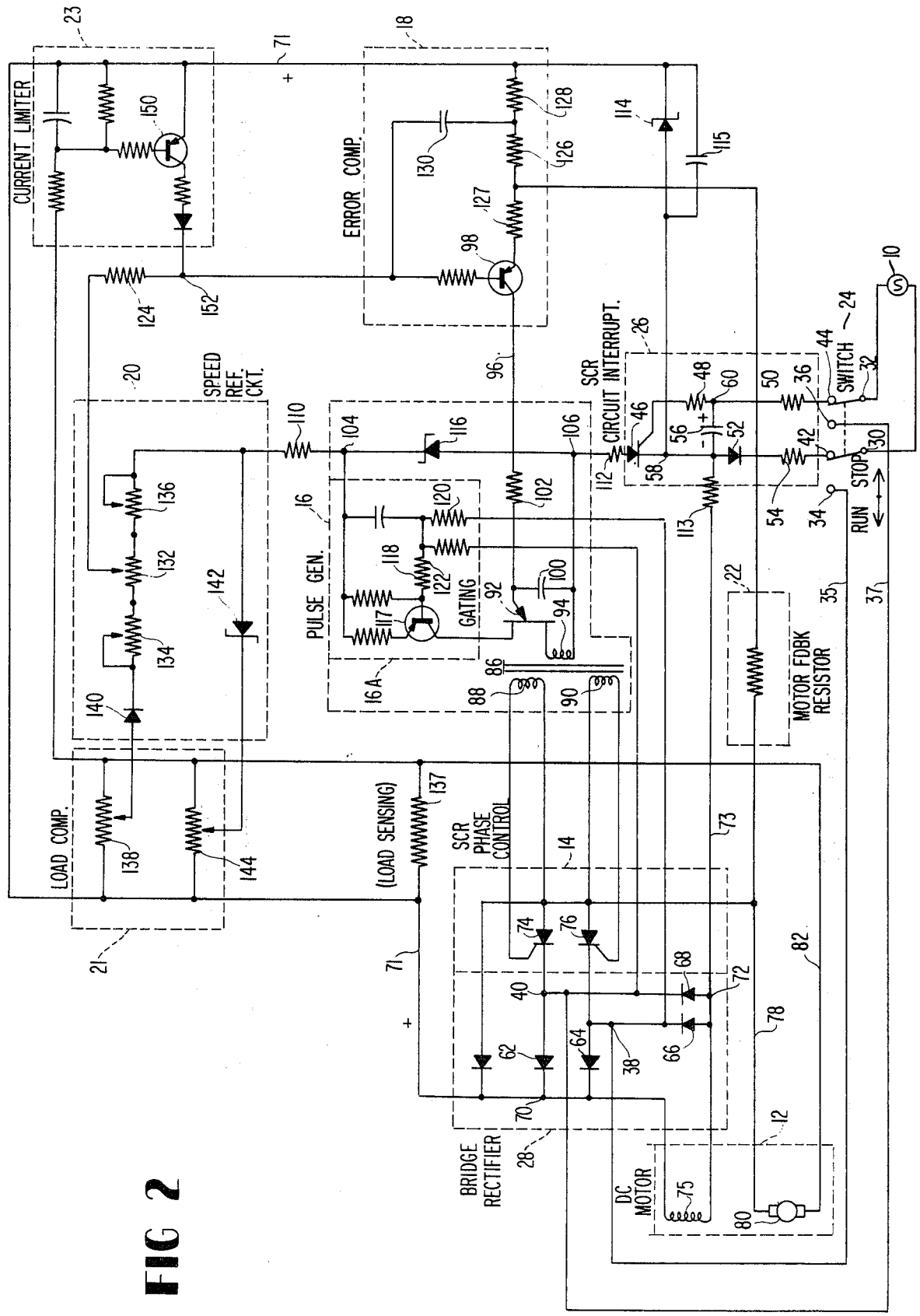
FIG. 2 is an electrical schematic diagram more fully illustrative of the embodiment shown in FIG. 1.

Directing attention now to FIG. 2, switch 24 comprises a double pole, two position switch which has two movable contact terminals 30 and 32 connected to the AC power source 10. One pair of fixed contacts 34 and 36 is coupled via conductors 35 and 37 to circuit junctions 38 and 40, respectively, which are common to both the phase-controlled SCR circuit 14 and the bridge rectifier 28. The other set of fixed contacts 42 and 44 is coupled to the interrupter circuit 26.

The interrupter circuit 26 includes a thyristor type of controlled semiconductor switch, more particularly an SCR 46 having its gate electrode coupled to switch terminal 44 by means of resistors 48 and 50, while its anode electrode is coupled to switch terminals 42 by means of a half-wave rectifier comprising semiconductor diode 52 and resistor 54. When desirable another type of thyristor switch, e.g., a TRIAC may be used in place of the SCR 46. When the switch 24 is moved to the STOP position shown, the SCR 46 receives gate drive by means of the operation of the diode 52, causing a unidirectional current of proper polarity to flow for rendering the device conductive. A capacitor 56 is coupled across circuit junctions 58 and 60 which charges to the line potential but forms an R-C discharge circuit in combination with resistor 48 for maintaining SCR 46 conductive for a predetermined time after switch 24 is moved to the RUN position, at which time the AC power from the source 10 is applied across circuit junctions 38 and 40.

Junctions 38 and 40 form diagonal junctions for the rectifier bridge 28 comprised of diodes 62 and 64 making up one pair of adjacent arms while diodes 66 and 68 form the other adjacent pair of arms. The opposite diagonal junctions of the rectifier bridge exist at junctions 70 and 72 provide the positive (+) and negative (−) DC power supply terminals which are connected to supply conductors 71 and 73 and across which is connected the field winding 75 of the motor 12 if it is the shunt type as illustrated.

The phase-controlled SCR circuit includes two SCR's 74 and 76. The cathode electrode of SCR 74 is connected to one side of the AC source 10 via circuit junction 40 while the other side of the AC source is connected to the cathode electrode of SCR 76 by means of circuit junction 38. The common anode connection of SCR 74 and SCR 76 is to circuit conductor 78, which connects to one side of the motor armature 80 while the other side of the armature is connected to conductor 82. The operation of this type of circuit is well known and described in detail in the above referenced Wisman patent, U.S. Pat. No. 3,555,386.

The gate electrodes of SCR 74 and 76 receive trigger pulses from the pulse generator circuit 16 by means of an output transformer 86 which includes a pair of secondary windings 88 and 90 which are coupled across the respective anode-gate junctions. The trigger pulses are produced at predetermined intervals in accordance with the operation of a unijunction relaxation oscillator circuit including unijunction transistor 92 coupled to the primary winding 94. The phase relation of the pulses appearing on the output windings 88 and 90 with respect to the AC power applied from the source is governed, however, by the magnitude of current in conductor 96 which is coupled to the collector of transistor 98 in the error comparator circuit 18 and which is adapted to charge the capacitor 100 through the resistor 102. When the charge and voltage across the capacitor 100 reaches a critical value, the unijunction transistor 92 conducts, discharging the capacitor 100 through the primary winding 94 and in doing so, generates a pulse across the secondary windings 88 and 90.

The DC supply potential for the pulse generator 16 is provided across junctions 104 and 106; however, the SCR circuit interrupter circuit 26 is in series with circuit junction 106. Series resistors 110 and 112 operate in conjunction with resistor 113, Zener diode 116 and capacitor 115 connected to junction 58 to provide the appropriate DC voltage level. Charge stored in capacitor 115, moreover, serves to maintain current through the SCR thyristor 46, pulse generator 16 and speed reference circuit 20 during zero crossing times of power line voltage. Zener diode 114 acts to prevent excessive voltage levels from appearing across capacitor 115 when SCR 46 is non-conductive after a power interruption. Thus as long as SCR 46 is in a conductive state, the DC supply circuit for both the pulse generator 16 and the speed reference circuit will be complete and thus in an operable state. A Zener diode 116 further maintains the interbase voltage for the unijunction transistor 92 at an appropriate level.

Operation of the pulse generator circuit 16 is synchronized with the AC power source 10 by means of a gating subsection 16A which includes a transistor 117 which is periodically driven into conduction by the base drive supplied from the bridge rectifier circuit 28 by means of resistors 118, 120 and 122, the latter being coupled to circuit junctions 38 and 40 respectively. Through most of the AC cycle of the power source 10, transistor 117 is driven into saturation but at the end of the cycle, base drive passes through a zero level and conduction of transistor 117 ceases thereby removing the interbase voltage from the unijunction transistor 92. This removal of interbase voltage causes capacitor 100 to discharge to a uniform level for the start of the succeeding half cycle of the AC power.

Thus what has been explained so far is means by which the armature current flowing in conductors 78 and 82 is controlled by means of the cyclic triggering of SCRs 74 and 76 by action of the pulse generator 16. Continuing further, the error comparator circuit 18 responds to a signal from the speed reference circuit 20 through a resistor 124 and compares this signal with a signal corresponding to motor armature voltage fed back through the motor feedback resistor 22. The positive DC power supply conductor 71 provides a common reference level. The speed reference potential indicative of the desired motor speed is applied to the base electrode of transistor 98 tending to drive it into conduction resulting in increased charging current drawn through capacitor 100 via conductor 96 and resistor 102. The increased charging current advances the firing time of the pulse generator 16, increasing the voltage applied to the motor armature 80. The armature voltage signal fed back through the resistor 22 develops a voltage drop across resistances 126 and 128 connected in the emitter circuit of transistor 98. This potential in the emitter circuit 10 tends to reduce the net base to emitter drive, thus reducing conduction of transistor 98 and causing equilibrium to be established between a given speed reference signal voltage and a definite motor armature voltage. Capacitor 130 acts to neutralize the effects of feedback ripple and acts in conjunction with resistor 124 to provide a soft timed ramp start.

The speed reference circuit 20 includes a speed selector potentiometer 132 which is connected in series between variable resistances 134 and 136 which are adapted to establish maximum and minimum speed limits. Resistance 134 connects to the IR load compensation network 21 which is responsive to the voltage appearing across a load sensing resistor 137 and more particularly to the potentiometer 138 by means of a diode 140. The voltage applied to the series combination of resistances 132, 134 and 136 is furthermore regulated by a Zener diode 142 coupled to the potentiometer 144 also coupled across the load sensing resistor 137.

A current limiter circuit 23 is also disclosed shown including transistor 150 and its associated components. This circuit is coupled from the common + potential via circuit conductor 71 back to the error comparator 18 at the junction 152. The emitter electrode of transistor 150 is connected to the positive supply conductor 71. When transistor 150 is non-conducting, the circuit has no effect upon operation; however, should armature current tend to increase beyond a predetermined safe threshold value, transistor 150 will become conductive, causing a signal to be coupled to the error comparator circuit 18, which then generates an appropriate error signal to compensate for this effect.

As noted above, the embodiment shown in FIGS. 1 and 2 discloses a series circuit relationship of the DC power supply potential between the pulse generator 16 and the speed reference circuit 20. What is significant, however, is the presence of SCR 46 in this series connection which will remain conductive and thus provide a continuous DC power supply path as long as the AC power from the source 10 is applied to the bridge rectifier circuit 28; however, should an outage, i.e., an interruption of the AC power for any reason SCR 46 will become non-conductive and will remain non-conductive providing an open circuit in the DC supply path until the switch 24 is again moved to the STOP position when the outage from the source 10 has been corrected. Thereupon SCR 46 will again be rendered conductive and held conductive for a short interval by means of capacitor 56, whereupon the switch 24 can be moved to the RUN position again reapplying the AC power to the bridge rectifier 28 and thus reestablishing system operation.

Figure 3:
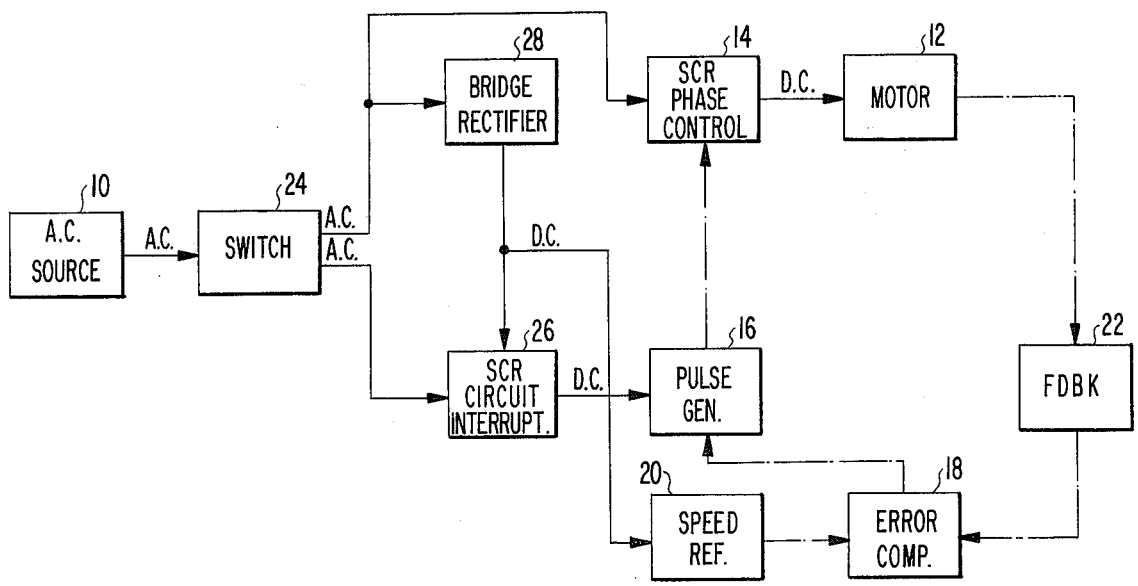
FIG. 3 is a block diagram showing a modification of the embodiment shown in FIG. 1.
Figure 4:
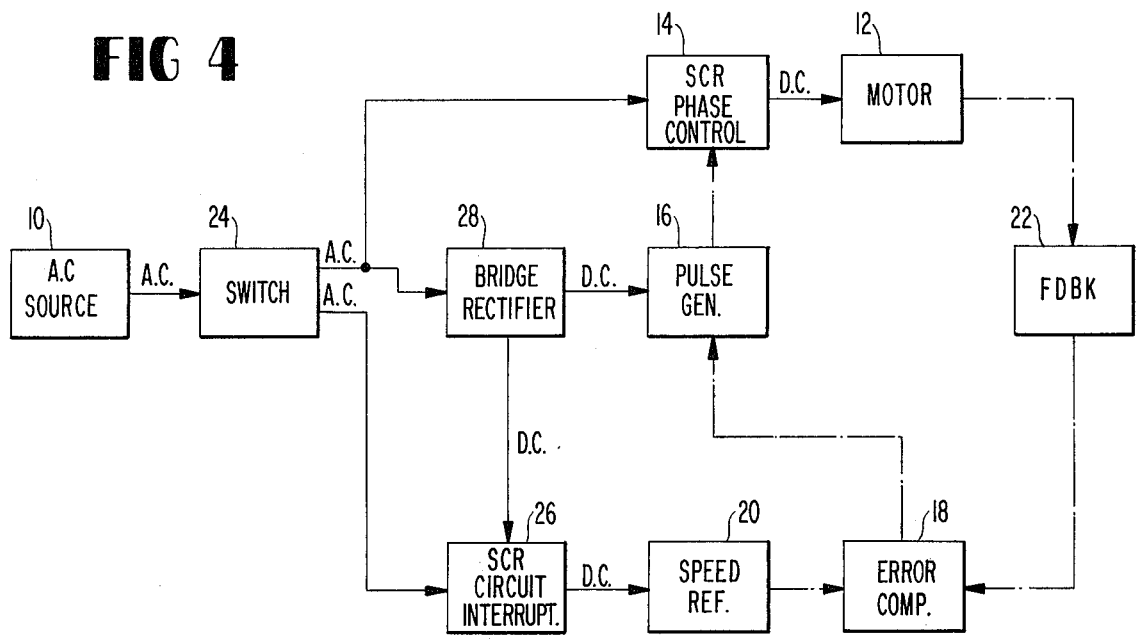
FIG. 4 is a block diagram further illustrative of yet another modification of the embodiment shown in FIG. 1.

It should be pointed out that the configuration shown in FIGS. 1 and 2 is not intended to be interpreted in a restrictive sense, since other circuit modifications may be resorted to without departing from the spirit and scope of the invention. Two such modifications are shown, for example, in FIGS. 3 and 4. The block diagram in FIG. 3 is intended to show that, when desirable, the bridge rectifier 28 can provide separate DC supply potentials to the speed reference circuit and the pulse generator 16 with the SCR circuit interrupter 26 being inserted in the DC supply line for the pulse generator 16 independently of the DC supply to the speed reference circuit 20. FIG. 4, on the other hand, is illustrative of an arrangement whereby the bridge rectifier independently feeds the DC supply potential to the speed reference circuit and the pulse generator 16; however, the SCR interrupter circuit 26 is interposed in the DC supply circuit for the speed reference circuit 20 independently of the DC supply potential applied to the pulse generator 16. Although not illustrated, the SCR circuit interrupter circuitry 26 shown in FIG. 2 could also be interposed in the circuit conductor 96 of FIG. 2 intermediate the resistor 102 and the transistor 98.

Figure 5:
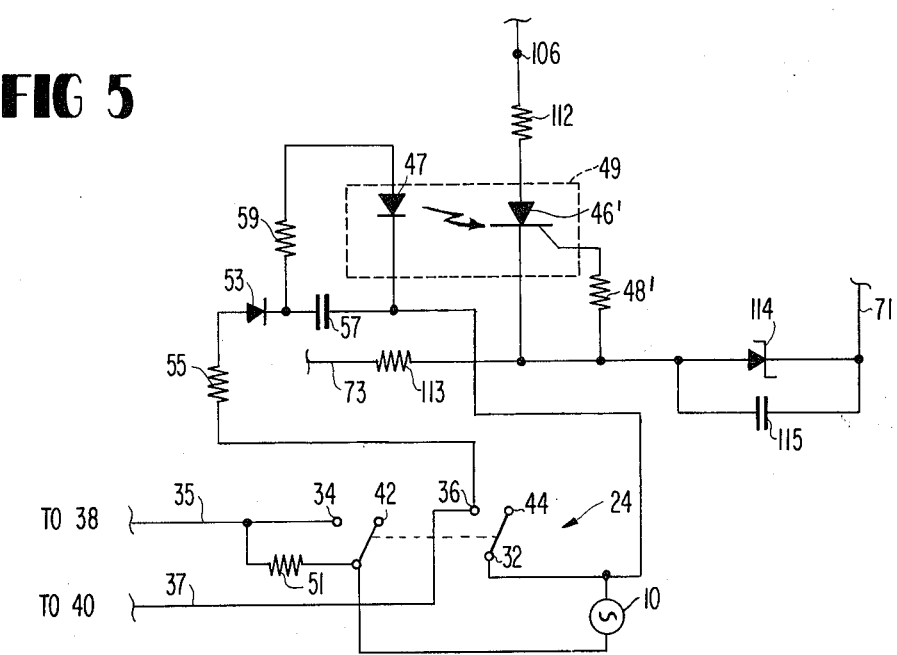
FIG. 5 is an electrical schematic diagram of another embodiment of the SCR circuit interrupter shown in FIG. 2.

Referring now to FIG. 5, there is disclosed another embodiment of the SCR circuit interrupter 26 shown in FIG. 2. Optically coupled means 49 including a light emitting diode 47 is adapted to trigger a light sensitive SCR 46'. The diode 47 is energized when the switch contacts 34 and 36 feeding bridge rectifier 28 and SCR phase control circuit 14 are open, i.e., in the STOP position. Contacts 42 and 44 of the switch 24 are now in use. Capacitor 57 and resistor 59 function in the same fashion as their counterparts, capacitor 56 and resistor 48 in FIG. 2, except that they feed light emitting diode 47 instead of the gate of SCR 46. When the switch is in the STOP position as illustrated, capacitor 57 is charged from the source 10 through diode 53, resistor 55, the bridge rectifier and SCR phase control circuitry connected to circuit conductor 35 and 37 and resistor 51. The values of the resistances 51, 55 and 59 are selectively chosen to maintain current therethrough at a level of a few milliamperes as needed by the light emitting diode 47 without significantly exciting the bridge circuitry which require much greater current magnitudes. When the switch is in the RUN position, the charging path for capacitor 57 is effectively short circuited by switch contacts 32 and 36.

Thus what has been shown and described is circuit interrupter means interposed into the relatively low power control circuitry portion of a system which has power applied to a load through a power converter such as AC power being applied to a DC motor through a phase-controlled SCR circuit. Energization of the circuit interrupter is first made by coupling it to the power source momentarily which is then adapted to render the control circuitry operative upon the subsequent coupling of the power source to the power converter.

Having thus disclosed what is at present considered to be the preferred embodiment of the subject invention, I claim 1. In electrical apparatus wherein power is supplied from a power source to a load through power conversion means which has its operation controlled in accordance with control signals applied thereto from control circuit means powered by a supply potential generated from said power source, said control circuit means producing said control signals when operative, the improvement comprising:
   circuit interrupter means, having controlled conductive and non-conductive operating states, coupled to said control circuit means for rendering said control circuit means operative when in said conductive operating state; and
   circuit means coupled to said circuit interrupter means and being operable to first apply said power source to said circuit interrupter means for causing said interrupter means to assume said conductive operating state and then subsequently disconnect said power source from said circuit interrupter means and apply said power source to said power conversion means, said circuit interrupter means assuming said non-conductive operating state in the event of a power outage from said power source to render said control circuit means inoperative until said circuit means reapplies said power source to said circuit interrupter means.

2. The apparatus as defined by claim 1 wherein said circuit interrupter means includes an electrically controlled switch means adapted to be rendered conductive when said power source is coupled thereto, and additionally including circuit means coupled to said electrically controlled switch means and being operable to maintain said controlled switch means in said conductive state for a predetermined time following disconnection of said power source therefrom.

3. The apparatus as defined by claim 1 wherein said circuit interrupter means includes semiconductor switch means adapted to be rendered conductive when said power source is coupled thereto, and additionally including circuit means coupled to said semiconductor switch means and being operable to maintain said semiconductor switch means in said conductive state for a predetermined time following disconnection of said power source therefrom.

4. The apparatus as defined by claim 1 wherein said circuit interrupter means includes a thyristor adapted to be rendered conductive when said power source is coupled thereto, and additionally including circuit means coupled to said thyristor and being operable to maintain said thyristor in said conductive state for a predetermined time following disconnection of said power source therefrom.

5. The apparatus as defined by claim 4 wherein said thyristor comprises a silicon controlled rectifier having a plurality of power conducting terminals and a control terminal, and wherein said means for maintaining said conductive state following disconnection of said power source comprises a resistance-capacitance discharge circuit coupled across one of said power conducting terminals and said control terminal, and wherein said capacitor is adapted to be charged from said power source.

6. The apparatus as defined by claim 4 wherein said thyristor has a pair of terminals for establishing a conductive state, and wherein said means for maintaining said conductive state following disconnection of said power source comprises a resistance-capacitance discharge circuit coupled across said pair of terminals for establishing a conductive state and wherein said capacitor is adapted to be charged from said power source.

7. The apparatus as defined by claim 6 wherein said thyristor comprises a controlled rectifier.

8. The apparatus as defined by claim 6 wherein said thyristor comprises an SCR.

9. The apparatus as defined by claim 1 wherein said power source comprises an AC power source, and said power conversion means comprises an AC to DC converter.

10. The apparatus as defined by claim 9 wherein said AC to DC power conversion means comprises a phase-controlled SCR circuit coupled to said AC power source and having silicon controlled rectifier means cyclically operable in accordance with said control signals for coupling power to said load, and wherein said control means comprises pulse generator means operable to generate said control signals at specific time intervals during each cycle of the AC power source.

11. The apparatus as defined by claim 10 wherein said circuit interrupter means is adapted to remove the supply potential from said control circuit means when in said non-conductive operating state.

12. The apparatus as defined by claim 11 wherein said load comprises the armature circuit of a shunt field DC motor.

13. In electrical apparatus wherein power is supplied from a power source to a load through cyclically conductive power conversion means having its operation controlled in accordance with control signals applied thereto from control circuit means, a supply potential source coupled to said power source providing a supply potential coupled to said control circuit means, said means being rendered operative by said supply potential to produce said control signals, the improvement comprising:
   electrically controlled circuit interrupter means including semiconductor switch means, having a conductive and a non-conductive state, intercoupled between said supply potential and said control circuit means and rendering said control circuit means operative when in said conductive state; and
   circuit means coupled to said semiconductor switch means and including a switch operable to temporarily couple said power source to said semiconductor switch means for causing said semiconductor switch means to initially assume said conductive state and thereafter coupling said power source to said power conversion means, said semiconductor switch means becoming non-conductive in the event of failure of said supply potential to render said control circuit means inoperative until said switch temporarily reapplies said power source to said circuit interrupter means.

14. The apparatus as defined by claim 13 wherein said semiconductor switch means comprises a thyristor having a pair of power conducting terminals and a control terminal and additionally including circuit means intercoupling said pair of power conducting terminals between said supply potential and said control circuit means, and circuit means coupling one of said power conducting terminals and said control terminal to said switch for being coupled to said power source.

15. The apparatus as defined by claim 14 wherein said power source comprises an AC power source having cyclical zero crossings and wherein said circuit means coupling one of said power conducting terminals and said control terminal to said switch includes rectifier means for causing unidirectional current flow to said thyristor for latching said thyristor into conduction.

16. The apparatus as defined by claim 15 and additionally including a capacitor circuit coupled between said power conducting terminal and said control terminal for accumulating a charge when said power source is temporarily coupled to said thyristor and thereafter being adapted to discharge through said thyristor control rectifier upon its being uncoupled from said power source to maintain conductivity of said thyristor until said power source is coupled to said power conversion means.

17. The apparatus as defined by claim 16 wherein said thyristor comprises an SCR having a gate, anode and cathode electrode.

18. The apparatus as defined by claim 17 wherein said switch comprises a two-pole, two-position switch including a pair of movable contacts and two pairs of fixed contacts, and wherein said pair of movable contacts is coupled across said AC power source, one pair of fixed contacts is coupled across said gate electrode and either of said anode or cathode electrodes of said silicon control rectifier and the other pair of fixed contacts is coupled to said power conversion means.

19. The apparatus as defined by claim 13 wherein said power source has cyclical zero crossings and additionally including energy storage means associated with said supply potential source for maintaining control circuit means current through the cyclical zero crossings of said power source.

20. The apparatus as defined by claim 19 wherein said energy storage means comprises capacitor means.

21. The apparatus as defined by claim 1 wherein said circuit interrupter means includes a light emitting semiconductor device optically coupled to light sensitive semiconductor switch means, said light emitting device being rendered conductive when said power source is coupled thereto to latch said semiconductor switch means into conduction and additionally including circuit means coupled to said light emitting semiconductor device and being operable to maintain said device in said conductive state for a predetermined time following disconnection of said power source therefrom.

22. The apparatus as defined by claim 21 wherein said light emitting semiconductor device comprises a light emitting diode.

23. The apparatus as defined by claim 21 wherein said light sensitive semiconductor switch means comprises a light sensitive thyristor.

24. The apparatus as defined by claim 21 wherein said light emitting semiconductor device comprises a light emitting diode and said light sensitive semiconductor device comprises a light sensitive thyristor.

25. The apparatus as defined by claim 24 wherein said light sensitive thyristor comprises a light sensitive controlled rectifier.

26. The apparatus as defined by claim 24 wherein said light sensitive thyristor comprises a light sensitive SCR.

* * * * *